(12) United States Patent
Guo et al.

(10) Patent No.: US 12,511,745 B2
(45) Date of Patent: Dec. 30, 2025

(54) METHOD FOR DETECTING A RIB WITH A MEDICAL IMAGE, DEVICE, AND MEDIUM

(71) Applicant: ALIBABA (CHINA) CO., LTD., Hangzhou (CN)

(72) Inventors: Heng Guo, Hangzhou (CN); Jianfeng Zhang, Hangzhou (CN); Minfeng Xu, Beijing (CN); Le Lyu, Bethesda, MD (US)

(73) Assignee: Alibaba (China) Co., Ltd., Hangzhou (CN)

( * ) Notice: Subject to any disclaimer, the term of this patent is extended or adjusted under 35 U.S.C. 154(b) by 470 days.

(21) Appl. No.: 18/327,227

(22) Filed: Jun. 1, 2023

(65) Prior Publication Data

US 2023/0401706 A1  Dec. 14, 2023

(30) Foreign Application Priority Data

Jun. 8, 2022 (CN) .......................... 202210648147.6

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/10081* (2013.01); *G06T 2207/20084* (2013.01)

(58) Field of Classification Search
CPC .............................. G06T 7/0012; G06T 7/11; G06T 2207/10081
See application file for complete search history.

(56) References Cited

U.S. PATENT DOCUMENTS 10,621,724 B2 * 4/2020 Wang .................... G06T 7/0014
11,715,206 B2 * 8/2023 Yu ......................... G06V 10/751
(Continued)

FOREIGN PATENT DOCUMENTS

CN      113506288 A      10/2021
CN      113592768 A      11/2021
(Continued)

OTHER PUBLICATIONS

Wang et al., MDU-Net: A Convolutional Network for Clavicle and Rib Segmentation from a Chest Radiograph, Jul. 2020, Journal of Healthcare Engineering vol. 2020, 9 pages (Year: 2020).*
(Continued)

*Primary Examiner* — Mohammed H Zuberi
(74) *Attorney, Agent, or Firm* — Armstrong Teasdale LLP

(57) ABSTRACT

A method for detecting a rib with a medical image, a device and a medium are provided. Feature coding is performed, by using a neural network model, on different rib regions in the medical image to obtain multiple feature vectors. According to a learned corresponding relationship between rib query items and the different rib regions, a feature vector for respective rib query item is determined. Parallel decoding is performed on the feature vector for respective rib query item to obtain a rib detection result corresponding to respective rib query item. The rib query items are endowed with semantic information in anatomy, such that respective rib query items may focus on features of different rib regions, and thus realizing controllable rib detection in instance-level. Any rib detection result includes a rib prediction classification and a prediction value of a pose parameter, in a three-dimensional space, of a rib detection box.

19 Claims, 5 Drawing Sheets

(56) References Cited

U.S. PATENT DOCUMENTS

| | | | |
|---|---|---|---|
| 11,790,523 B2* | 10/2023 | Niemeijer | G06V 10/454 |
| | | | 382/128 |
| 2018/0232603 A1* | 8/2018 | Shim | G06F 18/24133 |
| 2019/0066293 A1* | 2/2019 | Wang | G06T 7/143 |
| 2021/0042923 A1* | 2/2021 | Yu | G06T 7/74 |
| 2021/0150724 A1* | 5/2021 | Cheng | G06T 7/11 |
| 2021/0248716 A1* | 8/2021 | Vera-Gonzalez | G06V 10/82 |
| 2021/0312629 A1* | 10/2021 | Cheng | G06T 7/11 |
| 2022/0198230 A1* | 6/2022 | Chen | G06F 18/2415 |
| 2022/0414869 A1* | 12/2022 | Butler | G06T 7/11 |
| 2023/0108036 A1* | 4/2023 | Yu | G06T 7/0014 |
| | | | 382/128 |

FOREIGN PATENT DOCUMENTS

| | | |
|---|---|---|
| CN | 113902702 A | 1/2022 |
| CN | 114359642 A | 4/2022 |
| CN | 114445382 A | 5/2022 |

OTHER PUBLICATIONS

Samei et al., Rib Detection in MR Images Using Shape Priors and Appearance Models, 2014, Computer Vision Laboratory, 4 pages (Year: 2014).*

China First Office Action, Application No. 202210648147.6, dated Mar. 14, 2025, 34 pps.: with English translation.

* cited by examiner

METHOD FOR DETECTING A RIB WITH A MEDICAL IMAGE, DEVICE, AND MEDIUM

CROSS-REFERENCE TO RELATED APPLICATIONS

This application claims priority to Chinese patent application, No. 202210648147.6, entitled "METHOD FOR DETECTING A RIB WITH A MEDICAL IMAGE, DEVICE, AND MEDIUM", filed with the Chinese Patent Office on Jun. 8, 2022, which is hereby incorporated by reference in its entirety.

TECHNICAL FIELD

The present application relates to the field of the computer technology, and in particular to a method for detecting a rib with a medical image, a device, and a medium.

BACKGROUND

A computer aided diagnosis (CAD) technology may help doctors find lesions, based on the powerful analysis and calculation ability of computers and combined with the iconography, the medical image processing technology, and other possible physiological and biochemical means.

Automatically segmenting instance-level ribs from a computed tomography (CT) image is a prerequisite for many applications related to ribs. However, due to the influences under situations, such as rib adhesion, structural damage, or limited field of view (FOV), existing rib segmentation methods have poor accuracy. Therefore, a new solution needs to be proposed.

SUMMARY

Multiple aspects of the present application provide a method for detecting a rib with a medical image, a device, and a medium, to accurately segment a rib from the medical image in instance-level.

An embodiment of the present application provides a method for detecting a rib with a medical image. The method includes: acquiring a three-dimensional medical image containing ribs; performing, by using a neural network model, feature coding on different rib regions in the medical image, to obtain multiple feature vectors; determining, according to a learned corresponding relationship between rib query items and the different rib regions in the medical image, a feature vector corresponding to a respective one of at least one rib query item; wherein there is a one-to-one correspondence between the at least one rib query item and at least one rib instance to be detected; and performing parallel decoding on the feature vector corresponding to the respective one of the at least one rib query item, to obtain a rib detection result corresponding to respective one of the at least one rib query item; wherein a rib detection result corresponding to any rib query item includes: a rib prediction classification corresponding to the rib query item, and a prediction value of a pose parameter, in a three-dimensional space, of a rib detection box corresponding to the rib query item.

An embodiment of the present application also provides a method for detecting a rib with a medical image, applied to an AR device. The method includes: acquiring a three-dimensional medical image containing ribs; performing, by using a neural network model, feature coding on different rib regions in the medical image, to obtain multiple feature vectors; determining, according to a learned corresponding relationship between rib query items and the different rib regions in the medical image, a feature vector corresponding to a respective one of at least one rib query item; wherein there is a one-to-one correspondence between the at least one rib query item and at least one rib instance to be detected; performing parallel decoding on the feature vector corresponding to the respective one of the at least one rib query item, to obtain a rib detection result corresponding to the respective one of the at least one rib query item; herein, any rib detection result includes: a rib prediction classification, and a prediction value of a pose parameter, in a three-dimensional space, of a rib detection box; and superimposing and displaying, in a captured real image, the rib detection result corresponding to respective one of the at least one rib query item.

An embodiment of the present application also provides a method for detecting a rib with a medical image. The method includes: in response to a calling request for a first interface from a client, acquiring a three-dimensional medical image containing ribs from an interface parameter of the first interface; performing, by using a neural network model, feature coding on different rib regions in the medical image, to obtain multiple feature vectors; and determining, according to a learned corresponding relationship between rib query items and the different rib regions in the medical image, a feature vector corresponding to a respective one of at least one rib query item; wherein there is a one-to-one correspondence between the at least one rib query item and at least one rib instance to be detected; and performing parallel decoding on the feature vector corresponding to the respective one of the at least one rib query item, to obtain a rib detection result corresponding to the respective one of the at least one rib query item; herein, any rib detection result includes: a rib prediction classification, and a prediction value of a pose parameter, in a three-dimensional space, of a rib detection box.

An embodiment of the present application also provides an electronic device. The electronic device includes a memory and a processor. The memory is configured for storing one or more computer instructions; and the processor is configured for executing the one or more computer instructions to perform steps of the method provided by the embodiments of the present application.

An embodiment of the present application also provides a computer-readable storage medium storing a computer program. The computer program, when executed, enables implementation of the operations of the method provided by the embodiments of the present application.

In the method for detecting a rib with a medical image provided by the embodiments of the present application, feature coding may be performed, by using a neural network model, on different rib regions in the medical image, to obtain multiple feature vectors. According to a learned corresponding relationship between rib query items and the different rib regions in the medical image, a feature vector corresponding to a respective one of at least one rib query item may be determined. The feature vector corresponding to the respective one of the at least one rib query item may be decoded in parallel, to obtain a rib detection result corresponding to the respective one of the at least one rib query item. Herein, the rib query items are endowed with semantic information in anatomy, such that respective rib query items may focus on features of different rib regions, and thus realizing the controllable rib detection in instance-level. Meanwhile, any rib detection result includes a rib prediction classification, and a prediction value of a pose parameter, in a three-dimensional space, of a rib detection box. The position of a rib instance in the three-dimensional space can be accurately determined based on the prediction value of the pose parameter, so as to realize precise rib instance segmentation in the three-dimensional medical image.

BRIEF DESCRIPTION OF THE DRAWINGS

The drawings illustrated herein are used to provide a further understanding of the present application and form a part of the present application. The schematic embodiments of the present application and the illustration of these embodiments are used to explain the present application and do not constitute an undue limitation of the present application. In the drawings.

DETAILED DESCRIPTION

In order to make purposes, technical solutions, and advantages of the present application clearer, the technical solutions of the present application will be described clearly and completely in combination with the specific embodiments of the present application and the corresponding drawings. Obviously, the described embodiments are only some, and not all, of the embodiments of the present application. Based on the embodiments in the present application, all other embodiments obtained by those skilled in the art without creative efforts fall within the scope of protection of the present application.

In view of the technical problems existing in the prior art, a solution is provided in some embodiments of the present application. The technical solutions provided by various embodiments of the present application are illustrated in detail below in combination with the drawings.

Figure 1:
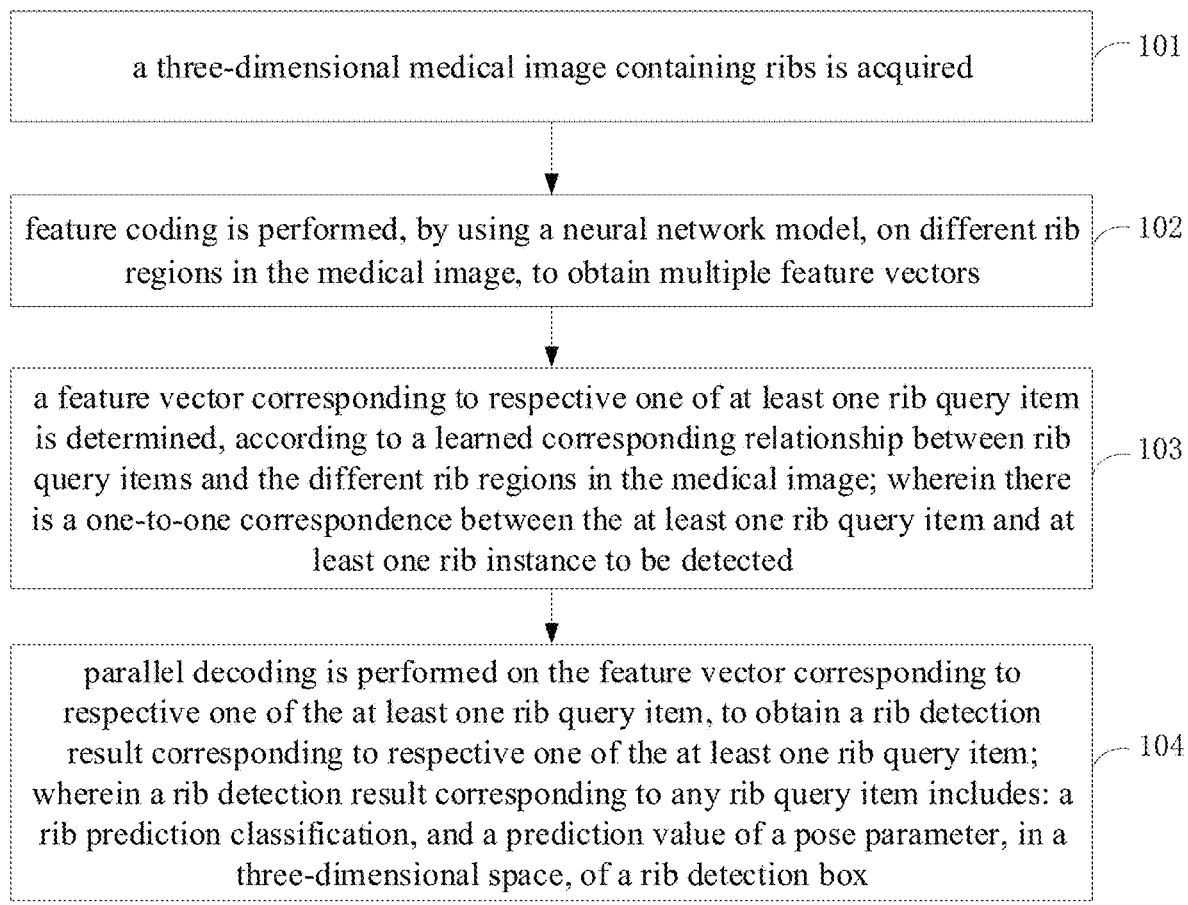
FIG. 1 is a schematic flow diagram of a method for detecting a rib with a medical image provided by an exemplary embodiment of the present application.

FIG. 1 is a schematic flow diagram of a method for detecting a rib with a medical image provided by an exemplary embodiment of the present application, as shown in FIG. 1. The method includes operations 101-104.

At operation 101, a three-dimensional medical image containing ribs is acquired.

At operation 102, feature coding is performed, by using a neural network model, on different rib regions in the medical image, to obtain multiple feature vectors.

At operation 103, a feature vector corresponding to a respective one of at least one rib query item is determined, according to a learned corresponding relationship between rib query items and the different rib regions in the medical image; wherein there is a one-to-one correspondence between the at least one rib query item and at least one rib instance to be detected.

At operation 104, parallel decoding is performed on the feature vector corresponding to the respective one of the at least one rib query item, to obtain a rib detection result corresponding to the respective one of the at least one rib query item; wherein a rib detection result corresponding to any rib query item includes: a rib prediction classification and a prediction value of a pose parameter, in a three-dimensional space, of a rib detection box.

The rib segmentation method provided by this embodiment may be used to segment ribs from a medical image in instance-level. Herein, the medical image refers to an image obtained by performing, based on the CT technology, axial tomography imaging on the chest and abdomen containing ribs. Under normal circumstances, 24 ribs may be shown in a human chest and abdomen CT image, and the 24 ribs are evenly distributed on the left and right sides of the thoracic cavity.

In this embodiment, because the number of ribs in the medical image is relatively fixed, the problem of detecting the ribs with the medical image may be converted into the problem of set prediction of the detection box, to improve the detection efficiency. Herein, the neural network model may be implemented based on the transformer architecture. In the neural network model based on the transformer, the coder may learn and focus on, through training, the features of different rib regions in an input image; and multiple object query items may be learned and multiple objects may be decoded in parallel through the decoder. Herein, the number of the object query items may be customized, and the binding relationship between the object query items and objects to be queried may be learned during training. Based on the learned binding relationship between the object query items and the objects to be queried, the neural network model may realize controllable object detection and segmentation.

In this embodiment, after the medical image is input into the neural network model, in the neural network model, the feature coding may be performed, by using the coder, on different rib regions in the medical image, to obtain multiple feature vectors.

The decoder, when used for rib instance segmentation, may learn an object query item about a rib instance. The object query item about the rib instance is described as a rib query item below. In this embodiment, ribs may be numbered sequentially, starting from the first rib on the upper left, from top to bottom and from left to right according to a distribution rule of the ribs, to obtain rib numbers 1~24, and the rib numbers are used as rib query items. In a training stage, each of the rib numbers 1~24 may be used as a rib query item, to learn an internal relationship between each rib query item and a position, in the medical image, of a rib instance corresponding to the rib query item.

The input of the decoder includes: at least one rib query item and multiple feature vectors output by the coder. Herein, there is a one-to-one correspondence between the at least one rib query item and ribs to be detected. The ribs to be detected may be specified by the user, or may be part or all of ribs in the medical image by default.

In some embodiments, at a prediction stage, the at least one rib query item may include: a rib query item corresponding to an object rib input by a user. For example, when the user requests to detect the third rib on the left, the number 3 corresponding to the third rib on the left may be used as the rib query item, to perform detection for a rib instance.

In other embodiments, at the prediction stage, the at least one rib query item may include: preset multiple rib query items having a one-to-one correspondence with multiple ribs in the medical image. That is, the rib query items involved in detection processes of rib instances by default include rib numbers 1~24.

In a training stage of the decoder, a bipartite matching method may be used to bind the rib query items with true values of rib classifications, and then the decoder may learn the corresponding relationship between the rib query items and different rib regions in the medical image. That is, each of the rib query items may be trained to make different rib query items focus on different rib regions in the medical image. Based on the corresponding relationship between the rib query items and the different rib regions in the medical image, the decoder may determine a feature vector corresponding to a respective one of the at least one rib query item. That is, each rib query item acquires a feature vector of a region on which this rib query item focuses.

The decoder may decode the feature vector corresponding to the respective one of the at least one rib query item in parallel, to obtain a rib detection result corresponding to respective one of the at least one rib query item. Herein, a rib detection result corresponding to any rib query item may include: a rib prediction classification corresponding to the rib query item and a prediction value of a pose parameter, in the three-dimensional space, of a rib detection box corresponding to the rib query item. Herein, rib prediction classifications include: a non-rib classification (i.e., a background classification) and 24 different rib classifications. Herein, the rib classification may be marked with a rib number. Herein, the pose parameter is used for describing a position and pose of a detection box of a rib instance. Herein, the position may be a position, in the three-dimensional space, of the center point of the detection box of the rib instance, and the pose may be a rotation angle, in the three-dimensional space, of the detection box.

In some embodiments, the pose parameter, in the three-dimensional space, of the rib detection box may at least include a pose parameter with 9 degrees of freedom, that is: center point coordinates (x, y, z) of the rib detection box in a coordinate system XYZ corresponding to the medical image; scale information (w, h, d) of the rib detection box on the X axis, Y axis, and Z axis; and rotation angles ($\alpha$, $\beta$, $\gamma$) of the rib detection box relative to the X axis, Y axis, and Z axis. That is, the predicted pose parameter output by the neural network may at least include parameter prediction values in terms of the above 9 degrees of freedom. Herein, the X direction corresponds to the right direction of the human body, the Y direction corresponds to the front (chest)-rear (back) direction of the human body, and the Z direction corresponds to the up (head)-down (foot) direction of the human body.

In this embodiment, feature coding may be performed, by using the neural network model, on different rib regions in the medical image, to obtain multiple feature vectors. According to the learned corresponding relationship between rib query items and the different rib regions in the medical image, a feature vector corresponding to the respective one of the at least one rib query item may be determined. The feature vector corresponding to the respective one of the at least one rib query item may be decoded in parallel, to obtain a rib detection result corresponding to the respective one of the at least one rib query item. Herein, the rib query items are endowed with semantic information in anatomy, such that respective rib query items may focus on features of different rib regions, and thus realizing the controllable rib detection in instance-level. Meanwhile, any rib detection result includes a rib prediction classification, and a prediction value of a pose parameter, in the three-dimensional space, of a rib detection box; and the position of the rib instance in the three-dimensional space may be accurately determined based on the prediction value of the pose parameter, so as to precisely realize the rib instance segmentation in the three-dimensional medical image.

On the basis of the above various embodiments, after obtaining the rib detection result corresponding to the respective one of the at least one rib query item, the neural network model may also segment the rib instance from the medical image according to the rib detection result corresponding to the respective one of the at least one rib query item, to obtain an image segmentation result.

In this implementation, the manner of "first detection and then segmentation" is used. Each rib query item corresponds to one rib detection result, and for each rib detection result, one rib instance may be obtained by segmentation. Furthermore, the rib segmentation in instance-level is realized, which reduces the interference of the rib adhesion or the structural damage on the rib segmentation, and improves the visualization and accuracy of rib segmentation results.

Figure 2:
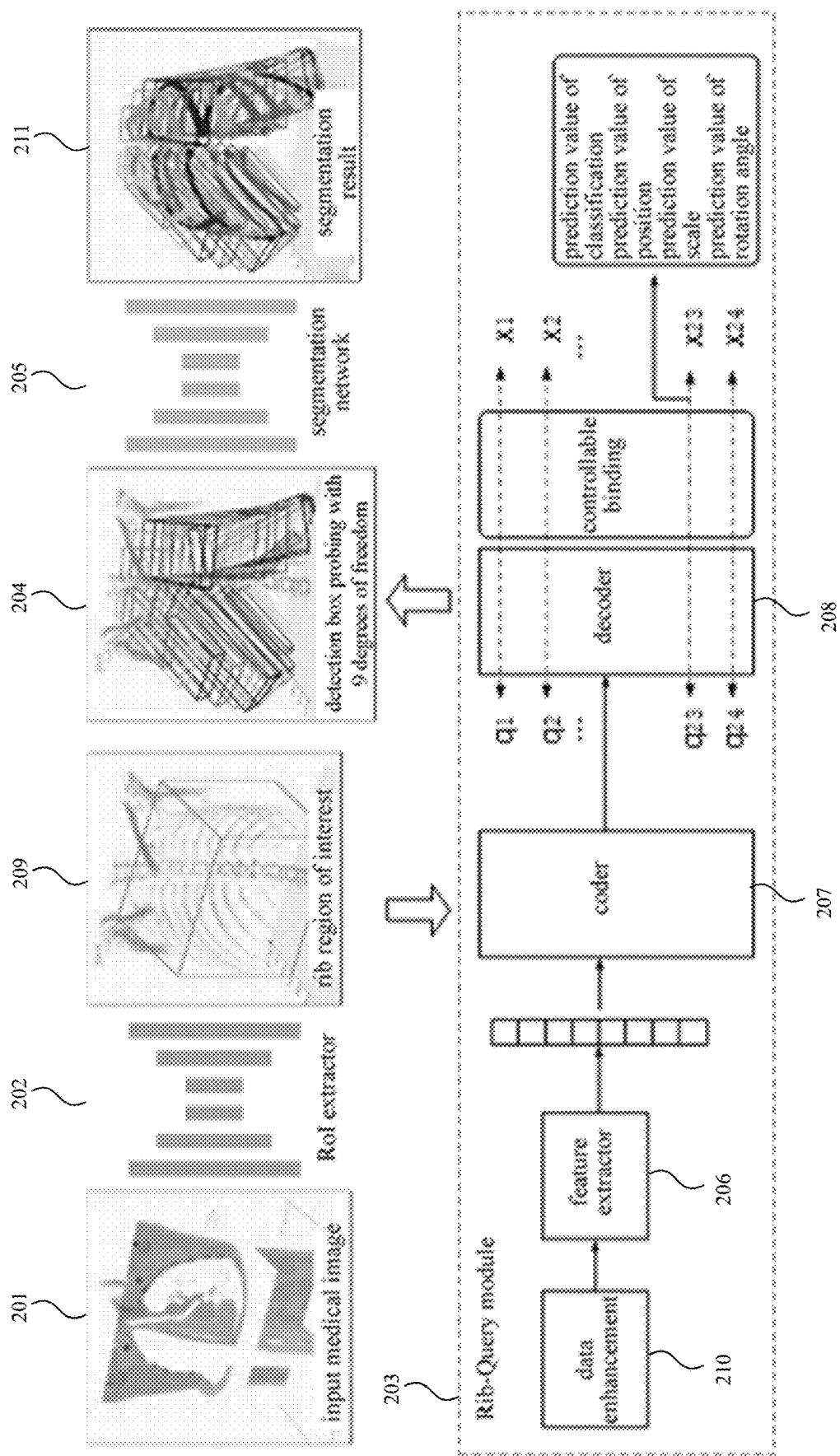
FIG. 2 is a schematic structural diagram of a neural network model provided by an exemplary embodiment of the present application.

In some exemplary embodiments, the neural network model used in the present application may be implemented based on a transformer network structure shown in FIG. 2 or a variant network thereof, which is not limited in this embodiment.

As shown in FIG. 2, the neural network model, when configured for performing the segmentation operation for the rib instance, mainly includes: an input layer, an RoI (region of interest) extractor 202, a rib-query module 203, a detection box probing module 204, and a segmentation network 205 that are successively connected.

The RoI extractor 202 and the segmentation network 205 may be implemented based on segmentation modules that are independent of each other, to perform different segmentation tasks at different spatial resolutions. Herein, the segmentation modules may be implemented as U-Net modules, V-Net modules or FCN (Full Convolution Network) modules, which are included but not limited in this embodiment. Herein, the rib-query module 203 is implemented based on the transformer network, and mainly contains a feature extractor 206, a coder 207, and a decoder 208.

The detection process and the segmentation process of a rib instance will be further illustrated in combination with FIG. 2 below.

After the medical image 201 is input into the neural network model, the RoI extractor 202 may be used to extract, from the medical image 201, a three-dimensional region of interest 209 containing ribs. Generally, the medical image 201 is anisotropic, and pixel spacings in three scanning directions, that is, X, Y, and Z directions, in the local coordinate system are inconsistent. Herein, the pixel spacings in the X and Y directions are small and thus the resolution is high, which are usually 0.5 mm. The pixel spacing in the Z direction is large and is usually 1-3 mm. To facilitate the processing of the segmentation network, the pixel spacings in the medical image 201 may be adjusted to obtain an isotropic medical image, such that the pixel spacings in the three directions, that is, the X, Y, and Z directions are consistent, and then the adjusted medical image is input into the RoI extractor 202. The RoI extractor 202 may extract, from the isotropic medical image, a three-dimensional region of interest 209 containing ribs. For example, each of the pixel spacings of the three-dimensional medical image on the X, Y, and Z axes may be adjusted to 3 mm, and the RoI extractor 202 may perform training and inference at a resolution of 3 mm, to accurately extract the regions of interest 209 containing the ribs.

In the rib-query module 203, the feature extractor 206 may perform feature extraction on the region of interest 209, to obtain spatial features. As shown in FIG. 2, the flattened spatial features output by the feature extractor 206 are input into the coder 207. The coder 207 is mainly composed of a self-attention network and a feed-forward network (FFN). In the coder 207, self-attention coding may be performed, by using the self-attention network, on the input spatial features based on a self-attention mechanism, to obtain feature vectors corresponding to different rib regions.

In the training stage, optionally, before performing, by using the feature extractor 206, feature extraction on the region of interest, to obtain the spatial features, a data enhancement operation may be performed by a data enhancement module 210 on the region of interest, to improve the generalization performance and training efficiency of the model. Optionally, at least one of the following operations may be performed on the region of interest, to implement data enhancement on the region of interest: random displacement, random scale transformation, random rotation, random clipping, and random erasure.

Because positions, directions and scales of the ribs are different from each other, there may be local ambiguity between different CT scanning images. By performing operations, such as the random displacement, the random scale transformation, the random rotation, the input data may be more variable to accurately identify each rib instance. Herein, the random clipping may be performed along the Z axis in the three-dimensional space. Some rib instances may be truncated through the random clipping, to simulate various data under clinical conditions. Herein, through the random erasure, ribs, at the bottom of the images, in the training samples may be deleted according to a certain probability, to alleviate a possible existing over-prediction problem.

The feature vectors corresponding to the different rib regions output by the coder 207 will be input into the decoder 208. The input of the decoder 208 also includes at least one rib query item, such as q1, q2, . . . , q23, and q24 as shown in FIG. 2. Herein, the decoder 208 is mainly composed of a self-attention network, an attention network, and a feedforward neural network. After the at least one rib query item is input into the decoder 208, the self-attention calculation may be performed in the self-attention network, thereby enabling the information communication between the at least one rib query item and realizing the overall arrangement of the rib instances. After performing self-attention calculation for each rib query item, the rib query item is input into the attention network. For any rib query item, in the attention network, attention calculation is performed, based on the attention mechanism, on the input rib query item and the feature vector corresponding to the rib query item, to obtain a decoded vector.

Each of the decoded vectors output by the decoder 208 is output to a classification layer and a bounding box prediction layer respectively. In the classification layer, classification calculation may be performed according to the decoded vector for the rib query item, to obtain the rib prediction classification corresponding to the rib query item. In the bounding box prediction layer, bounding box prediction may be performed according to the decoded vector for the rib query item, to obtain a prediction value of a pose parameter, in the three-dimensional space, of the rib detection box 204 corresponding to the rib query item.

The prediction value of the pose parameter includes at least one of the following: a prediction value of a center position of the detection box 204, a prediction value of a scale of the detection box 204, and a prediction value of a rotation angle of the detection box 204.

In the local coordinate system, a parameter group of (x, y, z, w, h, d, α, β, γ) may be used to represent a detection box 204 with 9 degrees of freedom. Herein, (x, y, z) are coordinates of the center point of the detection box 204 on the X axis, Y axis, and Z axis; w is a scale of the detection box 204 on the X axis, h is a scale of the detection box 204 on the Y axis, and d is a scale of the detection box 204 on the Z axis; α is a rotation angle of the detection box 204 relative to the X axis, β is a rotation angle of the detection box 204 relative to the Y axis, and γ is a rotation angle of the detection box 204 relative to the Z axis. As shown in FIG. 2, the rib detection result corresponding to the rib query item output by the rib query module 203 may be input into a detection box probing module (that is, the detection box 204 probing module with 9 degrees of freedom shown in FIG. 2). The detection box probing module may draw, in the medical image, a rib detection box with 9 degrees of freedom corresponding to respective one of rib query items, based on the prediction value of the pose parameter of the detection box 204. After the rib detection box is determined, the rib segmentation may be performed by using the segmentation network 205. In this embodiment, in order to obtain more accurate rib segmentation results, a more precise spatial resolution may be used to independently segment each rib in the field of view (FOV) of the local clipping. An exemplary illustration will be given below in combination with the rib detection result for any rib query.

For any rib detection result, the segmentation network 205 may segment a sub-volume block from the medical image 201, according to the prediction value of the pose parameter, in the three-dimensional space, of the detection box 204 in the rib detection result. Optionally, the sub-volume block may be obtained from an original input medical image. The original input medical image has an original resolution. Under this original resolution, the pixel spacing is smaller (for example, 2 mm, 1 mm, or even 0.5 mm), which is conducive to acquiring more accurate segmentation results. After acquiring the sub-volume block, the binary segmentation may be performed on the sub-volume block, to obtain a segmentation result of a rib instance and a segmentation of a non-rib region in the sub-volume block.

In this embodiment, the segmentation network may include multiple parallel rib segmentation heads. When the rib query module 203 outputs rib detection results for multiple rib query items, multiple sub-volume blocks may be segmented from the medical image having the original resolution according to the rib detection results for the multiple rib query items, and the binary segmentation is performed on the multiple sub-volume blocks in parallel by using the multiple rib segmentation heads.

In the process of the binary segmentation, the rib region of interest is segmented into foreground, and other tissues (including adjacent ribs) are segmented into background. The segmentation results may be represented by binary masks. In the mask, pixels with a value of 1 are pixels in the rib instance, and pixels with a value of 0 are pixels in the background. After acquiring a binary mask for respective one of multiple ribs, the binary mask may be combined with a corresponding classification prediction label and a spatial position, to form the final instance segmentation result 211.

In this embodiment, on the one hand, the controllable rib detection and segmentation results may be acquired by performing the rib detection and segmentation based on the rib query items. On the other hand, using a detection box 204 with 9 degrees of freedom to estimate the position of the rib instance can more accurately segment the rib from the three-dimensional space, and can effectively deal with abnormal situations, such as the rib adhesion and the structural damage.

In the above and the following embodiments of the present application, a controllable query function for rib segmentation results 211 may be provided to the user based on the rib query items. An exemplary illustration will be given below.

In some optional embodiments, after the rib instance is segmented from the medical image 201 according to the rib detection result corresponding to respective one of the at least one rib query item to obtain the image segmentation result 211, a segmentation request for any rib instance input by the user may be acquired, the object rib query item corresponding to the rib instance may be determined, and the rib segmentation result corresponding to the object rib query item may be determined from the image segmentation result and taken as the segmentation result of the rib instance. After the segmentation result of the rib instance is determined, the segmentation result of the rib instance may be prominently displayed in the medical image.

Figure 3:
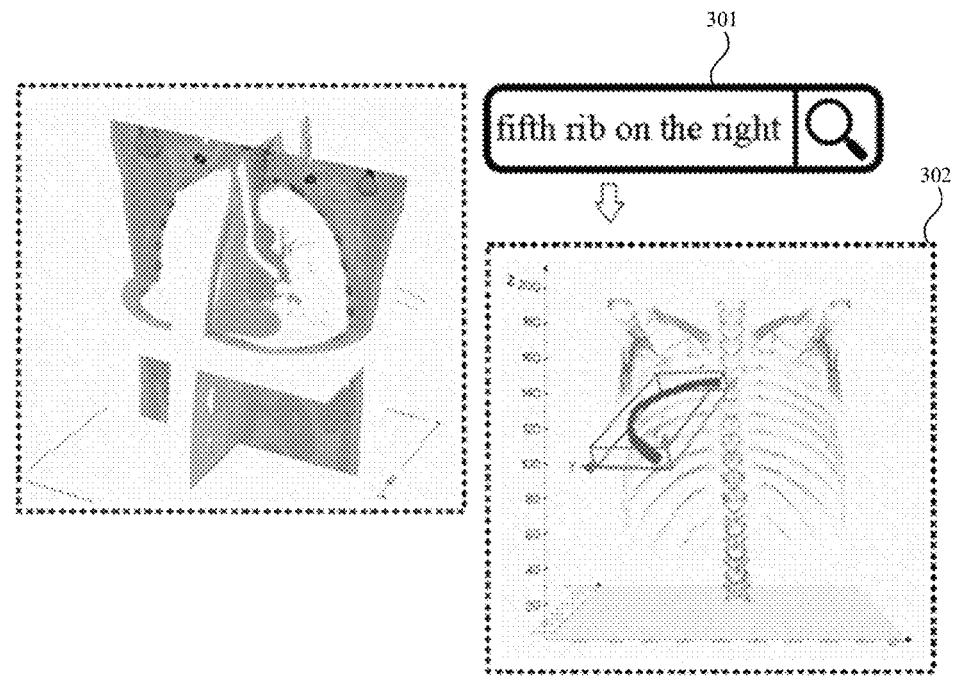
FIG. 3 is a schematic diagram of a rib segmentation result when a rib query item is provided.

For example, as shown in FIG. 3, the user may input a query item 301: querying the fifth rib on the right. Based on the mapping relationship between the left-right rib order and the rib query items, it can be determined that the rib query item 301 of the fifth rib on the right 301 is: the rib number 5. If the rib segmentation result 302 corresponding to the at least one rib query item 301 contains the rib segmentation result corresponding to the rib number 5, the rib segmentation result 302 corresponding to the rib number 5 may be returned as the segmentation result corresponding to the fifth rib on the right. In the medical image, the segmentation result of the fifth rib on the right may be prominently displayed by highlighting or special marking, to make the query result more intuitive.

Based on this implementation, directional segmentation of ribs is realized, and a specified rib segmentation result may be flexibly returned to the user according to the user requirement.

The above embodiment illustrates the rib detection and segmentation logic performed by the neural network in an inference stage. In addition to the above method for detecting a rib, an embodiment of the present application also provides a method for training a neural network model. In the training process, the forward propagation process of the neural network model is as described in the previous embodiment. The neural network model may detect, based on the method for detecting a rib provided by the previous embodiment, a rib in instance-level from an input medical image, to complete the forward propagation, which will not be repeated.

In the training stage, the neural network model may be optimized on the basis of the forward propagation, with a goal of reducing an inference error. That is, after the rib detection result corresponding to respective one of at least one rib query item is obtained, supervision training may be further performed on the neural network model in combination with a preset supervision signal.

Optionally, a true value of the rib classification corresponding to respective one of the at least one rib query item and a true value of the pose parameter of the rib detection box corresponding to respective one of the at least one rib query item may be acquired. The true value of the rib classification may be preset. The true value of the pose parameter of the rib detection box may be calculated from a chest and abdomen scanning image. An exemplary illustration will be given below.

After acquiring three views obtained by scanning the chest and abdomen along the X, Y, and Z axes, three-dimensional space reconstruction may be performed through the three views, to reconstruct the poses of the ribs in the three-dimensional space, and then the reconstructed poses of the ribs are continued to be visualized. Herein, rib instances may be marked in the three views and labels (such as color) marking the same rib instance are the same. After the three-dimensional reconstruction of the rib instances, the rib instances in the three-dimensional space may be marked in the manner of marking the rib instances in the three views, so as to display and distinguish different rib instances in a visualization manner.

Based on the rib instance after the three-dimensional reconstruction and visualization, parametric expression of the rib instance is calculated by using the principal component analysis (PCA) method, and the calculated parametric expression is used as the true value of the pose parameter of the rib detection box. Herein, based on the principal component analysis method, feature values and feature vectors of a rib voxel coordinate covariance matrix may be calculated, and the feature values may be sorted to determine axes, having corresponding feature vectors, of a local coordinate system. In the local coordinate system, a parameter group of (x, y, z, w, h, d, $\alpha$, $\beta$, $\gamma$) may be used to represent a detection box with 9 degrees of freedom.

Figure 4:
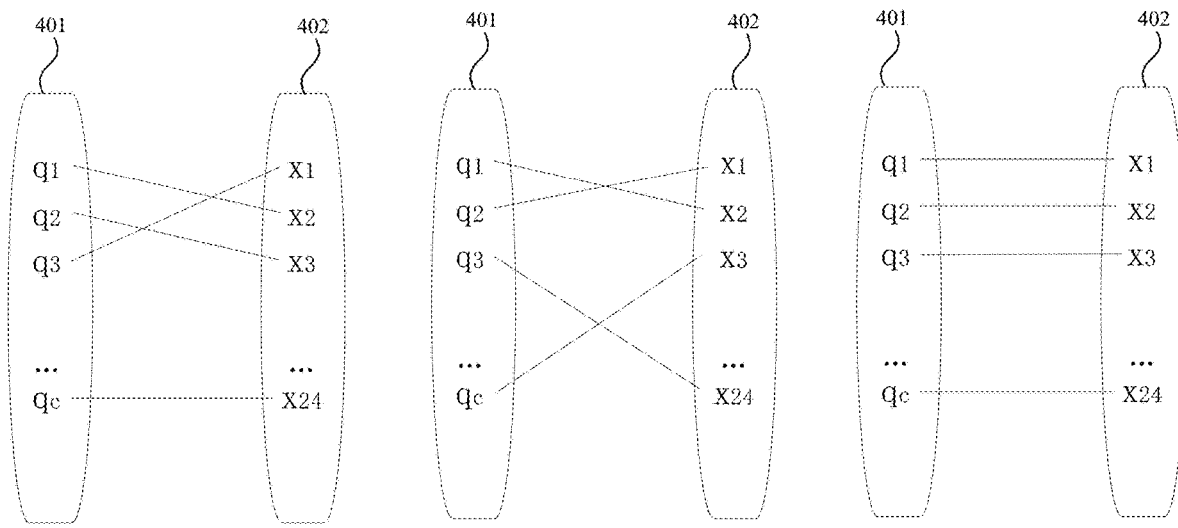
FIG. 4 is a schematic diagram of a bipartite matching process between rib query items and truth values of rib classifications.

In the training process, a bipartite matching method may be used to find an arrangement of rib query items, to map prediction results of the rib query items to true values of rib classifications, as shown in FIG. 4. In the illustration shown in FIG. 4, the matching relationship between the rib query items q 401 and the truth values x 402 of the rib classifications may be learned in the training process, to achieve better matching. In order to find a better matching, a matching loss of bipartite matching may be constructed to bind the rib query items 401 with the true values 402 of the rib classifications, so as to train the neural network model to find the region focused on by each rib query item respectively.

Optionally, the matching loss of the bipartite matching may at least include three parts: classification loss, bounding box prediction loss, and a penalty term. Herein, the classification loss may be determined according to an error between the true value of the rib classification corresponding to respective one of the at least one rib instance and the rib prediction classification corresponding to respective one of the at least one rib instance. The bounding box prediction loss is determined according to an error between the true value of the pose parameter of the rib detection box corresponding to respective one of the at least one rib instance and the prediction value of the pose parameter of the rib detection box corresponding to respective one of the at least one rib instance. When a parameter with multiple degrees of freedom is used to describe the bounding box, the bounding box loss may contain regression loss with multiple degrees of freedom. Herein, the penalty term refers to a penalty term between the rib query item corresponding to respective one of the at least one rib instance and the true value of the rib classification corresponding to respective one of the at least one rib instance. In the training process, the rib query module may be guided, by configuring the penalty items, to learn the matching relationship between the rib query items and the true values of the rib classifications. When a rib query item matches or is close to a truth value of a rib classification specified by the user, the penalty item is smaller; on the contrary, the penalty item is larger.

Figure 5:
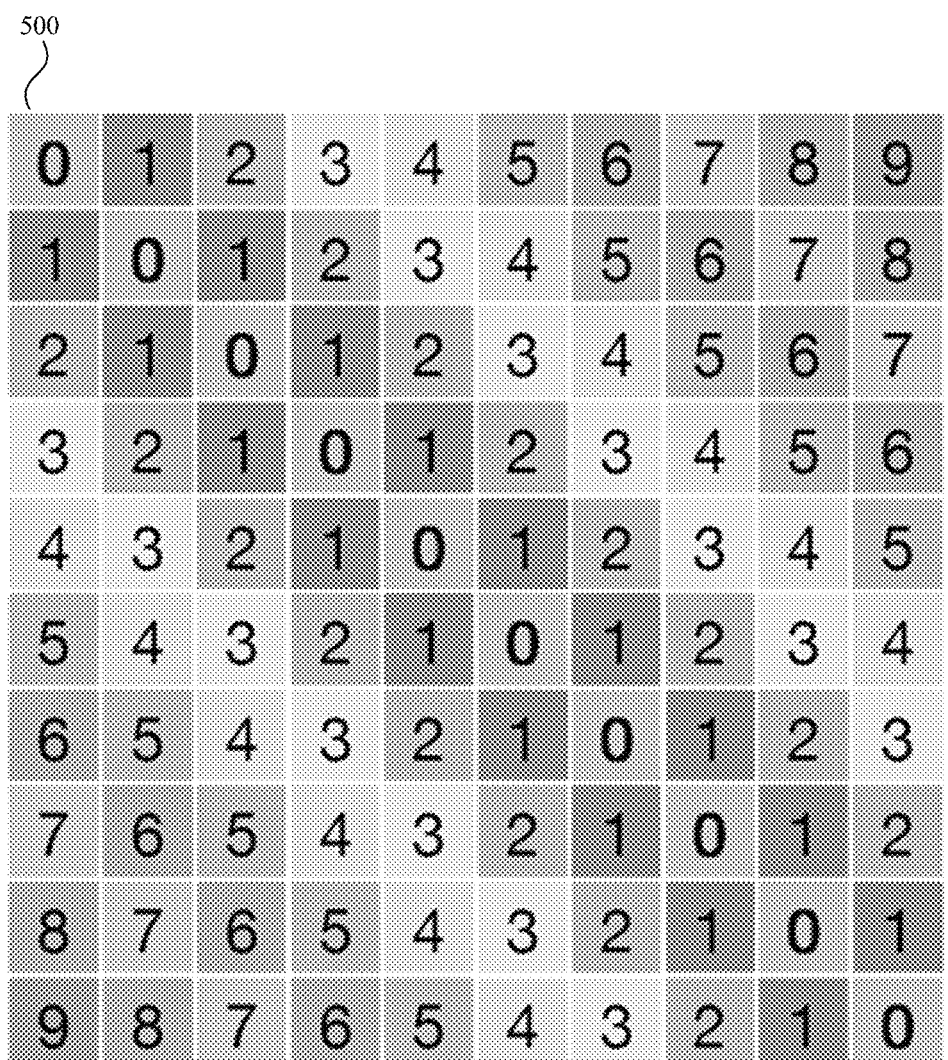
FIG. 5 is a schematic diagram of a weighted adjacency matrix for determining a penalty term of the bipartite matching.

In some optional embodiments, in order to quickly acquire the penalty item, indexes may be set for the rib query items and the true values of the rib classifications, and a weighted adjacency matrix 500 may be set according to an expected matching relationship between the rib query items and the true values of the rib classifications. The penalty term may be acquired by using the weighted adjacency matrix. If it is expected that a rib query item having an index is better matched with a true value of a rib classification having the same index, an implementation of the weighted adjacency matrix 500 may be shown in FIG. 5. In the weighted adjacency matrix 500, indexes of multiple rib query items are stored by row, and indexes of multiple true values of rib classifications are stored by column. Herein, when an index of a rib query item is the same as an index of a true value of a rib classification, the penalty value is 0. The greater the difference between an index of a rib query item and an index of a true value of a rib classification is, the greater a penalty value corresponding to a cross position between the values of the indexes is. For example, when an index of a rib query item is 1 and an index of a true value of a rib classification is 9, the penalty value is 8. When an index of a rib query item is 1 and an index of a true value of a rib classification is 2, the penalty value is 1.

For a rib query item corresponding to any rib, a penalty value between the rib query item and a true value of a rib classification corresponding to the rib query item is queried from the preset weighted adjacency matrix 500. Herein, the true value of the rib classification corresponding to the rib query item refers to a true value of a classification of an inferred rib instance corresponding to the rib query item.

In each round of training, after the matching loss is determined based on the above implementation, the matching relationship between the at least one rib query item and the true value of the rib classification may be updated according to the matching loss, to learn the corresponding relationship between the rib query items and the different rib regions in the medical image.

Illustration will be carried out with examples below.

It is assumed that a chest and abdomen CT scanning image contains N rib instances to be detected; herein, 1≤N≤C, and C is the maximum number of ribs in a normal chest and abdomen scanning image. Normally, C is set to 24. A set of ribs may be expressed as: $X=\{X_i=C_i, X_i^p, X_i^S, X_i^a\}$; herein, $X_i$ represents the i-th rib instance, $C_i$ represents a true value of a rib classification of the i-th rib instance, $X_i^p$ represents a true value of a center position of a detection box of the i-th rib instance, $X_i^S$ represents a true value of a scale of the detection box of the i-th rib instance, and $X_i^a$ represents a true value of a rotation angle of the detection box of the i-th rib instance.

A set of rib query items may be described as q={q1, 0≤i≤Q}, and the total number of query items may be set as C+1; and Q=C+1. In the rib query module, the decoder has C+1 output channels; herein, the channel 0 is used to output the background classification, and the channels 1~C are used to output the classification results of C rib instances. Herein, the weighted adjacency matrix may be marked as M, $M \in R^{(Q+1)\times(Q+1)}$.

The index of the rib query item corresponding to the i-th rib instance is described as σ(i), the detection result corresponding to the rib query item having the index σ(i) is described as $\hat{X}_{\sigma(i)}$, and then the matching loss of the rib query module about ($\hat{X}_{\sigma(i)}$, $X_i$), may be described as:

$$C(\hat{X}_{\sigma(i)}, X_i) = -\lambda_C \hat{p}_{\sigma(i)}(C_i) + \lambda_p \|\hat{X}_{\sigma(i)}^p - X_i^p\|_1 + \lambda_S \|\hat{X}_{\sigma(i)}^S - X_i^S\|_1 + \lambda_\alpha \|\hat{X}_{\sigma(i)}^\alpha - X_i^\alpha\|_1 + \lambda_m M[\sigma(i), C_i].$$

Equation 1

Herein, $C_i$ is the true value of the rib classification of the i-th rib instance, $\hat{p}_{\sigma(i)}(C_i)$ is the probability prediction of the i-th rib instance for the classification $C_i$, $\hat{X}_{\sigma(i)}^p$ is the prediction value of the center position of the detection box corresponding to the rib query item σ(i), and $X_i^p$ is the true value of the center position of the detection box corresponding to the i-th rib instance. $\hat{X}_{\sigma(i)}^S$ is the prediction value of the scale of the detection box corresponding to the rib query item σ(i), and $X_i^S$ is the true value of the scale of the detection box corresponding to the i-th rib instance. $\hat{X}_{\sigma(i)}^\alpha$ is the prediction value of the rotation angle of the detection box corresponding to the rib query item σ(i), and $X_i^\alpha$ is the true value of the rotation angle of the detection box corresponding to the i-th rib instance. M[σ(i), $C_i$] represents the penalty term between the rib query item σ(i) and the true value $C_i$, of the rib classification of the i-th rib instance. $\lambda_C, \lambda_p, \lambda_s, \lambda_\alpha$, and $\lambda_m$ are respectively a weighting coefficient of the rib classification, a weighting coefficient of the center position of the detection box, a weighting coefficient of the scale of the detection box, a weighting coefficient of the rotation angle of the detection box, and a weighting coefficient of the weighted adjacency matrix.

In the above embodiment, by adding the penalty item in the matching loss and using the weighted adjacency matrix to configure the size of the penalty value between the rib query item and the true value of the rib classification, such that each rib query item may be controlled to learn and predict a rib instance with the specified classification.

In each round of training, the Hungarian algorithm may be used, based on the above matching loss, to find a better matching relationship between the rib query items and the true values of the rib classifications. Thus, corresponding relationships between each rib query item and different rib regions in the medical image may be established in the training process, and a prediction task of the corresponding classification is constantly learned. In the inference process after training, each rib query item may infer and predict according to the learned corresponding relationship and the prediction task of the corresponding classification. In the training stage, the overall model loss function of the neural network model for N rib instances may be described as:

$$L(\hat{x}, x) = \frac{1}{N}\sum_{i=1}^{N}\{-\lambda_C \hat{p}_{\sigma(i)}(c_i) + \lambda_p \|\hat{x}_{\sigma(i)}^p - x_i^p\|_1 + \lambda_s \|\hat{x}_{\sigma(i)}^s - x_i^s\|_1 + \lambda_\alpha \|\hat{x}_{\sigma(i)}^\alpha - x_i^\alpha\|_1.$$

Equation 2

According to the above model loss function, a gradient descent method may be used to optimize the neural network model. When the above model loss function converges to a specified range, the training may be stopped and the trained neural network model may be output.

In the above training process, a constraint is added to the neural network model through the matching loss, such that the neural network learns the internal correlation between rib query items and feature vectors of different regions in the medical image. Therefore, rib instances may be accurately identified from different regions in the medical image, according to features of different regions in the medical image.

In some scenarios, the method for detecting a rib with a medical image provided by the preceding various embodiments may be encapsulated into a software tool, such as a SaaS (Software-as-a-Service) tool, that may be used by a third party. Herein, the SaaS tool may be implemented as a plug-in or an application. The plug-in or application may be deployed in a server and may open a specified interface to a third-party user, such as a client. For the convenience of description, in this embodiment, the specified interface is described as a first interface. Therefore, the third-party user, such as the client, may easily access and use, by calling the first interface, the above method provided by the server device. Herein, the server may be either a regular server or a cloud server, which is not limited in this embodiment.

Taking the SaaS tool corresponding to the method for detecting a rib with a medical image as an example, the server may: acquire, in response to a calling request from a client for a first interface, a three-dimensional medical image containing ribs from an interface parameter of the first interface; perform, by using a neural network model, feature coding on different rib regions in the medical image, to obtain multiple feature vectors; determine, according to a learned corresponding relationship between rib query items and the different rib regions in the medical image, a feature vector corresponding to respective one of at least one rib query item; wherein there is a one-to-one correspondence between the at least one rib query item and at least one rib instance to be detected; and perform parallel decoding on the feature vector corresponding to respective one of the at least one rib query item, to obtain a rib detection result corresponding to respective one of the at least one rib query item; herein, any rib detection result includes: a rib prediction classification, and a prediction value of a pose parameter, in a three-dimensional space, of a rib detection box.

When the rib segmentation service is provided, after the server obtains the rib detection result corresponding to respective one of the above at least one rib query item, the server may segment, according to the rib detection result corresponding to respective one of the above at least one rib query item, at least one rib instance from the medical image, to obtain an image segmentation result, and return the image segmentation result to the client for viewing.

In this implementation, the server may provide, based on the SaaS tool running on the server, the rib segmentation service for the medical image to the client, reducing the computing pressure and the computing cost of the client.

It should be noted that the executive body of each step of the method provided in the above embodiment may be the same device, or the method may also be performed by different devices as executive bodies. For example, the executive body of operations 101 to 104 shown and described with respect to FIG. 1 may be device A. For another example, the executive body of operations 101 and 102 may be the device A, and the execution body of the operation 103 may be device B, etc.

In addition, multiple operations that appear in a specific order are involved in the above embodiment and some processes described in the drawings. But it should be clearly understood that these operations may be performed in an order other than that described herein or these operations may be performed in parallel. The reference numbers of operations, such as 101 and 102, are only used to distinguish various different operations, and the numbers themselves do not represent any execution order. In addition, these processes may include more or fewer operations, and these operations may be performed sequentially or in parallel.

It should be noted that the expression, such as "first" and "second," herein is used to distinguish different messages, devices, modules, etc., which does not represent the sequential order, and also does not limit that the "first" and "second" are different types.

Figure 6:
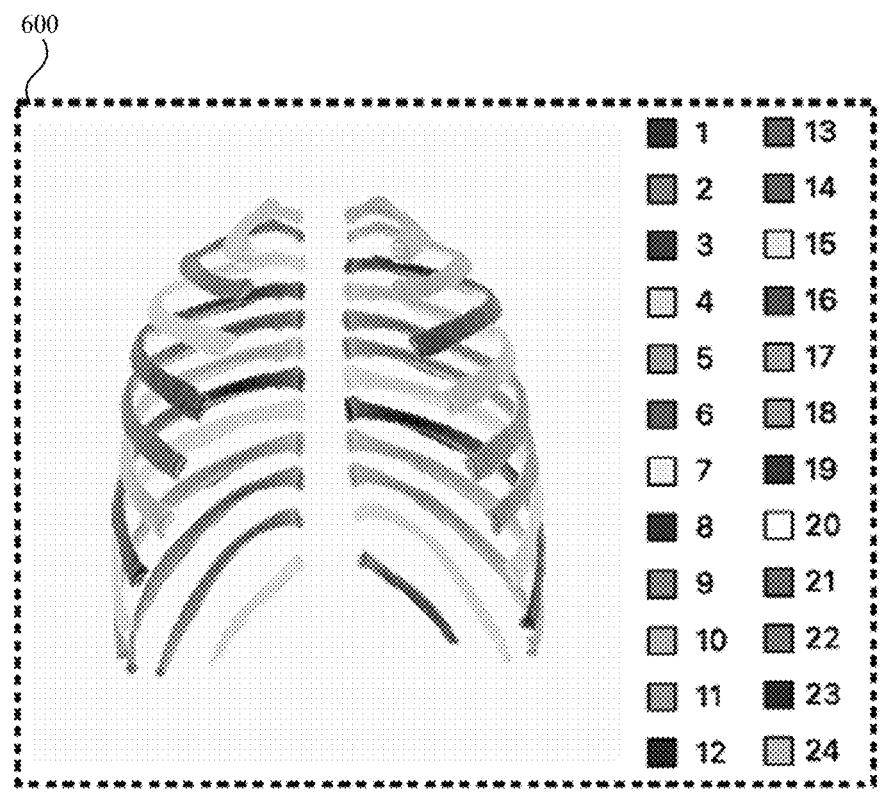
FIG. 6 is a schematic diagram of a segmentation result and a marking result of 24 rib instances in the medical image.

In addition to the rib instance segmentation scenario, the segmentation method provided by the above and the following various embodiments in the present application may also be extended to other scenarios, to segment an object with a certain distribution rule in the space. For example, the method may be applied to a scenario for segmenting commodities in a goods shelf image, which is not limited in this embodiment. A typical application scenario of the method for detecting a rib with a medical image provided by the embodiment of the present application will be exemplary illustrated in combination with FIG. 6 below.

In a typical application scenario, the method for detecting a rib with a medical image provided by the embodiment of the present application may be applied to the rib detection and segmentation process for a chest and abdomen radiography image. After acquiring a CT radiography image of the chest and abdomen of a patient, the CT radiography image may be input into an electronic device. The electronic device may: perform, by using a neural network model, feature coding on different rib regions in the medical image, to obtain multiple feature vectors; determine, according to a learned corresponding relationship between rib query items and the different rib regions in the medical image, a feature vector corresponding to respective one of at least one rib query item; wherein there is a one-to-one correspondence between the at least one rib query item and at least one rib instance to be detected; and perform parallel decoding on the feature vector corresponding to respective one of the at least one rib query item, to obtain a rib detection result corresponding to respective one of the at least one rib query item; herein, any rib detection result includes: a rib prediction classification, and a prediction value of a pose parameter, in a three-dimensional space, of a rib detection box.

After obtaining the rib detection result corresponding to respective one of the at least one rib query item, the electronic device may also segment at least one rib instance from the medical image according to the rib detection result corresponding to respective one of the at least one rib query item, to obtain an image segmentation result. Herein, the at least one rib instance may be marked and distinguished by using different colors.

In some embodiments, when the user provides rib search information, the electronic device may segment a rib instance specified by the user and display the rib instance through the neural network model, as shown in FIG. 3. In other embodiments, when the user does not provide the rib search information, the electronic device may segment all rib instances in the medical image through the neural network model by default, and display the rib instances 600, for example, the segmentation result of rib instances numbered 1~24 shown in FIG. 6.

In this implementation, the controllable rib instance segmentation is realized based on the rib query item, and the rib segmentation precision in the three-dimensional space is improved based on the prediction value of the pose of the detection box in the three-dimensional space.

It should be noted that the method for detecting a rib with a medical image provided by the previous various embodiments of the present application may also be implemented by an AR (augmented reality) device. The AR device may be implemented as an AR head-mounted display device, or may be implemented as an intelligent terminal device installed with an AR application, which is not limited in this embodiment. In the remote diagnosis and consultation scenario, a virtual image and a real image may be acquired by the AR device, and the virtual image and the real image may be superimposed and displayed. In this embodiment, the virtual image may be acquired from the three-dimensional medical image.

The AR device may acquire a three-dimensional medical image containing ribs. The medical image may be input by the user, or may be acquired by the AR device from server side, which is not limited in this embodiment. A neural network model for rib detection runs on the AR device. Herein, the neural network model may: perform feature coding on different rib regions in the medical image, to obtain multiple feature vectors; and determine, according to a learned corresponding relationship between rib query items and the different rib regions in the medical image, a feature vector corresponding to respective one of at least one rib query item; wherein there is a one-to-one correspondence between the at least one rib query item and at least one rib instance to be detected. The neural network model performs parallel decoding on the feature vector corresponding to respective one of the at least one rib query item, to obtain a rib detection result corresponding to respective one of the at least one rib query item; herein, any one rib detection result includes: a rib prediction classification, and a prediction value of a pose parameter, in a three-dimensional space, of a rib detection box.

After the AR device acquires detection results output by the neural network model, the AR device may superimpose and display, in the captured real image, the rib detection result corresponding to respective one of the at least one rib query item, thereby realizing the superimposition and displaying of the real image and the virtual rib detection results.

When the AR device displays the rib detection result corresponding to respective one of the at least one rib query item, the AR device may reconstruct a three-dimensional detection box in a virtual three-dimensional space according to the prediction value of the pose parameter, in the three-dimensional space, of the detection box corresponding to any rib query item, and display the reconstructed three-dimensional detection box. The true value of the corresponding rib classification may be marked near the three-dimensional detection box, to facilitate viewing and distinguishing the detection results of different rib instances displayed in the three-dimensional space.

In some embodiments, after the neural network model acquires the rib detection result corresponding to respective one of the at least one rib query item, the neural network model may perform the rib instance segmentation operation on the medical image, to obtain the segmented at least one rib instance. In this implementation, because the rib detection result includes the prediction value of the pose parameter, in the three-dimensional space, of the rib detection box, the three-dimensional rib instance may be segmented from the three-dimensional medical image. When the AR device displays the segmentation result, the AR device may display the segmentation result of the three-dimensional rib instance in the virtual three-dimensional space, so as to more clearly display the anatomical structure of the rib.

In the above implementations, based on the AR device, the rib detection or segmentation results in instance-level may be displayed in the three-dimensional space, and the rib detection or segmentation results in instance-level and real information (such as the lesion part) captured in the real scenario may be displayed in linkage, which may supplement more rich and accurate rib anatomy information to the real scenario.

Figure 7:
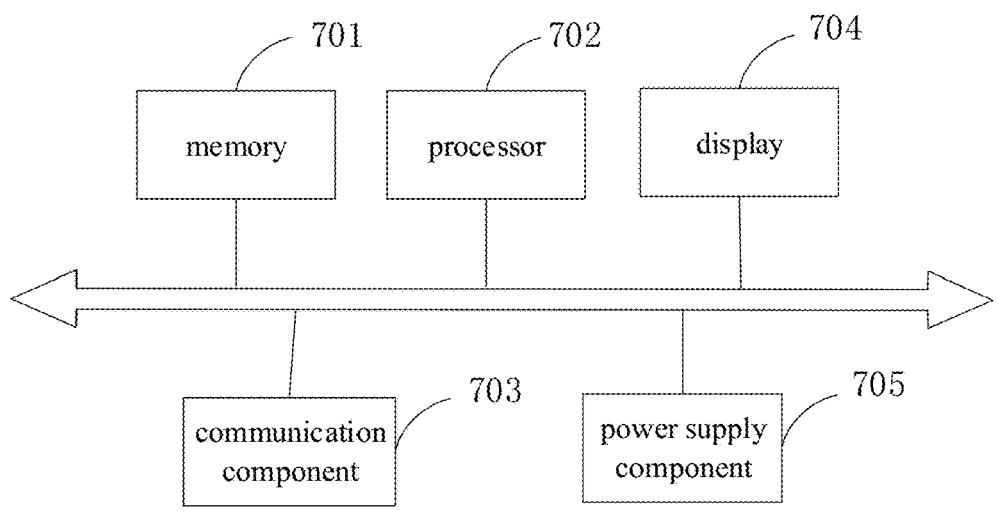
FIG. 7 is a schematic structural diagram of an electronic device provided by an exemplary embodiment of the present application.

FIG. 7 is a structural diagram of an electronic device provided by an exemplary embodiment of the present application. As shown in FIG. 7, the electronic device includes a memory 701 and a processor 702.

The memory 701 is configured for storing a computer program, and may be configured for storing various other data to support operations on the electronic device. Examples of the data include instructions used for any method or application operating on the electronic device.

The memory 701 may be realized by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The processor 702, coupled with the memory 701, is configured for executing the computer program in the memory 701, to: acquire a three-dimensional medical image containing ribs; perform, by using a neural network model, feature coding on different rib regions in the medical image, to obtain multiple feature vectors; determine, according to a learned corresponding relationship between rib query items and the different rib regions in the medical image, a feature vector corresponding to respective one of at least one rib query item; wherein there is a one-to-one correspondence between the at least one rib query item and at least one rib instance to be detected; and perform parallel decoding on the feature vector corresponding to respective one of the at least one rib query item, to obtain a rib detection result corresponding to respective one of the at least one rib query item; herein, any rib detection result includes: a rib prediction classification, and a prediction value of a pose parameter, in a three-dimensional space, of a rib detection box.

Optionally, the at least one rib query item includes: a rib query item corresponding to an object rib input by a user; or preset multiple rib query items having a one-to-one correspondence with multiple ribs in the medical image.

Optionally, after the processor 702 performs the parallel decoding on the feature vector corresponding to respective one of the at least one rib query item, to obtain the rib detection result corresponding to respective one of the at least one rib query item, the processor 702 is further configured for: segmenting, according to the rib detection result corresponding to respective one of the at least one rib query item, at least one rib instance from the medical image to obtain an image segmentation result.

Optionally, when the processor 702 segments, according to the rib detection result corresponding to respective one of the at least one rib query item, the at least one rib instance from the medical image to obtain the image segmentation result, the processor 702 is specifically configured for: for any rib detection result, segmenting a sub-volume block from the medical image, according to a prediction value of a pose parameter, in the three-dimensional space, of a detection box in the rib detection result; and performing binary segmentation on the sub-volume block, to obtain a segmentation result of a rib instance in the sub-volume block and a segmentation result of a non-rib region in the sub-volume block.

Optionally, after the processor 702 segments, according to the rib detection result corresponding to respective one of the at least one rib query item, the at least one rib instance from the medical image to obtain the image segmentation result, the processor 702 is further configured for: acquiring a segmentation request for any rib instance input by a user, and determining an object rib query item corresponding to the rib instance; determining a rib segmentation result corresponding to the object rib query item from the image segmentation result, taking the determined rib segmentation result as a segmentation result of the rib instance; and prominently displaying, in the medical image, the segmentation result of the rib instance.

Optionally, when the processor 702 performs the feature coding on the different rib regions in the medical image, to obtain the multiple feature vectors, the processor 702 is specifically configured for: adjusting a pixel spacing in the medical image to obtain an isotropic medical image; extracting, from the isotropic medical image, a three-dimensional region of interest containing the ribs, by using a segmentation network; performing feature extraction on the region of interest, to obtain spatial features; and performing, based on a self-attention mechanism, self-attention coding on the spatial features, to obtain feature vectors corresponding to the different rib regions.

Optionally, before the processor 702 performs the feature extraction on the region of interest, to obtain the spatial features, the processor 702 is further configured for: performing at least one of following operations on the region of interest, to implement data enhancement on the region of interest: random displacement, random scale transformation, random rotation, random clipping, and random erasure.

Optionally, when the processor 702 performs the parallel decoding on the feature vector corresponding to respective one of the at least one rib query item, to obtain the rib detection result corresponding to respective one of the at least one rib query item, the processor 702 is specifically configured for: for any rib query item, performing decoding on a feature vector corresponding to the rib query item based on an attention mechanism, to obtain a decoded vector; performing classification calculation according to the decoded vector, to obtain a rib prediction classification corresponding to the rib query item; and performing bounding box prediction according to the decoded vector, to obtain a prediction value of a pose parameter, in the three-dimensional space, of a rib detection box corresponding to the rib query item; wherein the prediction value of the pose parameter includes at least one of: a prediction value of a center position of the detection box, a prediction value of a scale of the detection box, and a prediction value of a rotation angle of the detection box.

Optionally, after the processor 702 performs the parallel decoding on the feature vector corresponding to respective one of the at least one rib query item, to obtain the rib detection result corresponding to respective one of the at least one rib query item, the processor 702 is further configured for: acquiring a true value of a rib classification corresponding to respective one of the at least one rib query item and a true value of a pose parameter of a rib detection box corresponding to respective one of the at least one rib query item; determining a classification loss, according to an error between the true value of the rib classification corresponding to respective one of the at least one rib query item and a rib prediction classification corresponding to respective one of the at least one rib instance; determining a bounding box prediction loss, according to an error between the true value of the pose parameter of the rib detection box corresponding to respective one of the at least one rib query item and a prediction value of the pose parameter of the rib detection box corresponding to respective one of the at least one rib query item; determining a penalty term between the rib query item corresponding to respective one of the at least one rib instance and the true value of the rib classification corresponding to respective one of the at least one rib instance; determining a matching loss according to the classification loss, the bounding box prediction loss, and the penalty item; and updating, according to the matching loss, a matching relationship between the at least one rib query item and the true value of the rib classification, to learn the corresponding relationship between the rib query items and the different rib regions in the medical image.

Optionally, when the processor 702 determines the penalty term between the rib query item corresponding to respective one of the at least one rib instance and the true value of the rib classification corresponding to respective one of the at least one rib instance, the processor 702 is specifically configured for: for any rib query item, querying, from a preset weighted adjacency matrix, a penalty value between the rib query item and a true value of a rib classification corresponding to the rib query item; wherein, in the weighted adjacency matrix, indexes of multiple rib query items are stored by row, and indexes of multiple true values of rib classifications are stored by column; and the greater a difference between an index of an rib query item and an index of a true value of a rib classification is, the greater a penalty value corresponding to a cross position between values of the indexes is.

Further, as shown in FIG. 7, the electronic device further includes: a communication component 703, a display 704, a power supply component 705, and other components. FIG. 7 shows only a part of components schematically, which does not mean that the electronic device only includes the components shown in FIG. 7.

The communication component 703 is configured for facilitating wired or wireless communication between a device, where the communication component is located, and other devices. The device where the communication component is located may access a wireless network that is based on a communication standard, such as WiFi, 2G, 3G, 4G, 5G, or a combination thereof. In an exemplary embodiment, the communication component receives, via a broadcast channel, a broadcast signal or broadcast related information from an external broadcast management system. In an exemplary embodiment, the communication component may be implemented based on the near-field communication (NFC) technology, the radio frequency identification (RFID) technology, the infrared data association (IrDA) technology, the ultra-wideband (UWB) technology, the Bluetooth (BT) technology, and other technologies.

The display 704 includes a screen. The screen may include a liquid crystal display (LCD) and a touch panel (TP). If the screen includes the touch panel, the screen may be implemented as a touch screen, to receive an input signal from the user. The touch panel includes one or more touch sensors to sense touch, slide, and gesture on the touch panel. The touch sensor may not only sense the boundary of the touch or slide action, but also detect the duration and pressure related to the touch or slide operation.

The power supply component 705 provides power for each of components of the device where the power supply component is located. The power supply component may include a power supply management system, one or more power supplies, and other components that are associated with generating, managing, and distributing power for the device where the power supply component is located.

In this embodiment, feature coding may be performed, by using a neural network model, on different rib regions in a medical image, to obtain multiple feature vectors. According to a learned corresponding relationship between rib query items and the different rib regions in the medical image, a feature vector corresponding to respective one of at least one rib query item may be determined. The feature vector corresponding to respective one of the at least one rib query item is decoded in parallel, to obtain a rib detection result corresponding to respective one of the at least one rib query item. Herein, the rib query items are endowed with semantic information in anatomy, such that respective rib query items may focus on features of different rib regions, and thus realizing the controllable rib detection in instance-level. Meanwhile, any rib detection result includes a rib prediction classification and a prediction value of a pose parameter, in a three-dimensional space, of a rib detection box; and the position, in the three-dimensional space, of the rib instance may be accurately determined based on the prediction value of the pose parameter, so as to realize precise rib instance segmentation in the three-dimensional medical image.

It should be noted that in addition to performing data processing operations according to the data processing logic recited in the preceding embodiment, the electronic device shown in FIG. 7 may also perform following operations according to the method for detecting a rib with a medical image recited as follows. The processor 702 is specifically configured for: acquiring, in response to a calling request from a client for a first interface, acquiring a three-dimensional medical image containing ribs from an interface parameter of the first interface; performing, by using a neural network model, feature coding on different rib regions in the medical image, to obtain multiple feature vectors; determining, according to a learned corresponding relationship between rib query items and the different rib regions in the medical image, a feature vector corresponding to respective one of at least one rib query item; wherein there is a one-to-one correspondence between the at least one rib query item and at least one rib instance to be detected; and performing parallel decoding on the feature vector corresponding to respective one of the at least one rib query item, to obtain a rib detection result corresponding to respective one of the at least one rib query item; herein, any rib detection result includes: a rib prediction classification, and a prediction value of a pose parameter, in a three-dimensional space, of a rib detection box.

The electronic device may return the rib detection result corresponding to respective one of the at least one rib query item to the client. In some embodiments, after the electronic device obtains the rib detection result corresponding to respective one of the at least one rib query item, the electronic device may further segment, according to the rib detection result corresponding to respective one of the at least one rib query item, at least one rib instance from the medical image, to obtain an image segmentation result, and return the image segmentation result to the client, which will be not repeated.

It should also be noted that in some embodiments, the electronic device shown in FIG. 7 may be realized as an AR device. In addition to the components shown in FIG. 7, the electronic device may also include an image acquisition apparatus (not shown). Herein, the image acquisition apparatus is configured for capturing a real image. The processor 702 is specifically configured for: acquiring a three-dimensional medical image containing ribs; performing, by using a neural network model, feature coding on different rib regions in the medical image, to obtain multiple feature vectors; determining, according to a learned corresponding relationship between rib query items and the different rib regions in the medical image, a feature vector corresponding to respective one of at least one rib query item; wherein there is a one-to-one correspondence between the at least one rib query item and at least one rib instance to be detected; performing parallel decoding on the feature vector corresponding to respective one of the at least one rib query item, to obtain a rib detection result corresponding to respective one of the at least one rib query item; herein, any rib detection result includes: a rib prediction classification, and a prediction value of a pose parameter, in a three-dimensional space, of a rib detection box; and superimposing and displaying, by a display 704, the rib detection result corresponding to respective one of the at least one rib query item, in a real image captured by the image acquisition apparatus.

Accordingly, an embodiment of the present application also provides a computer-readable storage medium storing a computer program. The computer program, when executed by the processor, enables to implement each of steps in the above method embodiment.

Those skilled in the art should understand that embodiments of the present invention may be provided as a method, a system, or a computer program product. Therefore, the present invention may take the form of complete hardware embodiments, complete software embodiments, or embodiments combining software and hardware aspects. Furthermore, the present invention may take the form of a computer program product that is implemented on one or more computer available storage medium (including but not limited to a magnetic disk memory, a CD-ROM, an optical memory, etc.) containing computer available program code.

The present invention is described with reference to the flow diagrams and/or the block diagrams of the method, device (system), and computer program product according to the embodiments of the present invention. It should be understood that each flow and/or each block in the flow diagrams and/or the block diagrams and the combination of flows and/or blocks in the flow diagrams and/or the block diagrams may be realized by computer program instructions. These computer program instructions may be provided to a processor of a general-purpose computer, a special-purpose computer, an embedded processor, or other programmable electronic devices to generate a machine, such that the instructions executed by the processor of the computer or other programmable electronic devices generate an apparatus for implementing functions specified in one or more flows of the flow diagrams and/or one or more blocks of the block diagrams.

These computer program instructions may also be stored in a computer-readable memory that can guide a computer or other programmable electronic device to work in a specific way, such that the instructions stored in the computer-readable memory generate a manufactured product including an instruction apparatus. The instruction apparatus implements the functions specified in one or more flows of the flow diagrams and/or one or more blocks of the block diagrams.

These computer program instructions may also be loaded to a computer or other programmable electronic devices, such that a series of operation steps are performed via the computer or the other programmable electronic devices to generate computer-implemented processing. Therefore, the instructions executed in the computer or the other programmable devices provide steps for implementing the functions specified in one or more flows of the flow diagrams and/or one or more blocks of the block diagrams.

In a typical configuration, the computing device includes one or more processors (CPUs), an input/output interface, a network interface, and a memory.

The memory may include a computer-readable medium, such as a non-permanent memory, a random access memory (RAM), and/or a non-volatile memory, for example, a read-only memory (ROM) or a flash RAM. The memory is an example of the computer-readable medium.

The computer-readable medium includes permanent and non-permanent, removable and non-removable media, in which information storage may be implemented by any method or technology. The information may be computer-readable instructions, data structures, modules of program, or other data. Examples of the computer storage medium include, but are not limited to, a phase change random access memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital video disk (DVD) or other optical storage, a cartridge tape, a magnetic tape magnetic disk storage, or other magnetic storage devices or any other non-transmission medium. The computer storage medium may be used for storing information that can be accessed by the computing device. According to the definition herein, the computer-readable medium does not include a transitory computer-readable media, such as modulated data signals and carriers.

It should also be noted that terms such as "include," "comprise," or any other variants thereof are intended to cover a non-exclusive inclusion, such that processes, methods, commodities, or devices, including a series of elements, include not only those elements that have been listed, but also other elements that are not specifically listed or the elements intrinsic to these processes, methods, commodities, or devices. Without further limitations, elements limited by the wording "include(s) a/an . . . " or "comprise(s) a/an . . . " do not exclude additional identical elements in the processes, methods, commodities, or devices that include the listed elements.

The above described embodiments are simply embodiments of the present application, and are not intended to limit the present application. For those skilled in the art, the present application may have various modifications and changes. Any modifications, alternatives, improvements, or the like within the spirit and principle of the present application shall be included in the scope of the claims of the present application.

What is claimed is:

1. A method for detecting a rib with a medical image, applied to an augmented reality (AR) device, comprising: acquiring a three-dimensional medical image comprising ribs; performing, by using a neural network model, feature coding on different rib regions in the medical image, to obtain a plurality of feature vectors; determining, according to a learned corresponding relationship between rib query items and the different rib regions in the medical image, a feature vector corresponding to a respective rib query item of at least one rib query item, wherein there is a one-to-one correspondence between the at least one rib query item and at least one rib instance to be detected; performing parallel decoding on the feature vector corresponding to the respective rib query item of the at least one rib query item, to obtain a rib detection result corresponding to the respective rib query item of the at least one rib query item, wherein any rib detection result comprises: a rib prediction classification, and a prediction value of a pose parameter, in a three-dimensional space, of a rib detection box; and superimposing and displaying, in a captured real image, the rib detection result corresponding to the respective rib query item of the at least one rib query item, wherein after performing the parallel decoding on the feature vector corresponding to the respective rib query item of the at least one rib query item, to obtain the rib detection result corresponding to respective rib query item of the at least one rib query item, the method further comprises: acquiring a true value of a rib classification corresponding to the respective rib query item of the at least one rib query item and a true value of a pose parameter of a rib detection box corresponding to the respective rib query item of the at least one rib query item; determining a classification loss, according to an error between the true value of the rib classification corresponding to the respective rib query item of the at least one rib query item and the rib prediction classification corresponding to the respective rib query item of the at least one rib instance; determining a bounding box prediction loss, according to an error between the true value of the pose parameter of the rib detection box corresponding to the respective rib query item of the at least one rib query item and the prediction value of the pose parameter of the rib detection box corresponding to the respective rib query item of the at least one rib query item; determining a penalty term between the rib query item corresponding to the respective rib instance of the at least one rib instance and the true value of the rib classification corresponding to the respective rib instance of the at least one rib instance; determining a matching loss according to the classification loss, the bounding box prediction loss, and the penalty item; and updating, according to the matching loss, a matching relationship between the at least one rib query item and the true value of the rib classification, to learn the corresponding relationship between the rib query items and the different rib regions in the medical image.

2. A method for detecting a rib with a medical image, comprising: acquiring a three-dimensional medical image comprising ribs; performing, by using a neural network model, feature coding on different rib regions in the medical image, to obtain a plurality of feature vectors; determining, according to a learned corresponding relationship between rib query items and the different rib regions in the medical image, a feature vector corresponding to a respective rib query item of at least one rib query item, wherein there is a one-to-one correspondence between the at least one rib query item and at least one rib instance to be detected; and performing parallel decoding on the feature vector corresponding to the respective rib query item of the at least one rib query item, to obtain a rib detection result corresponding to the respective rib query item of the at least one rib query item, wherein any rib detection result comprises: a rib prediction classification, and a prediction value of a pose parameter, in a three-dimensional space, of a rib detection box, wherein after performing the parallel decoding on the feature vector corresponding to the respective rib query item of the at least one rib query item, to obtain the rib detection result corresponding to respective rib query item of the at least one rib query item, the method further comprises: acquiring a true value of a rib classification corresponding to the respective rib query item of the at least one rib query item and a true value of a pose parameter of a rib detection box corresponding to the respective rib query item of the at least one rib query item; determining a classification loss, according to an error between the true value of the rib classification corresponding to the respective rib query item of the at least one rib query item and the rib prediction classification corresponding to the respective rib query item of the at least one rib instance; determining a bounding box prediction loss, according to an error between the true value of the pose parameter of the rib detection box corresponding to the respective rib query item of the at least one rib query item and the prediction value of the pose parameter of the rib detection box corresponding to the respective rib query item of the at least one rib query item; determining a penalty term between the rib query item corresponding to the respective rib instance of the at least one rib instance and the true value of the rib classification corresponding to the respective rib instance of the at least one rib instance; determining a matching loss according to the classification loss, the bounding box prediction loss, and the penalty item; and updating, according to the matching loss, a matching relationship between the at least one rib query item and the true value of the rib classification, to learn the corresponding relationship between the rib query items and the different rib regions in the medical image.

3. The method of claim 2, wherein the at least one rib query item comprises:
  a rib query item corresponding to an object rib input by a user; or
  a plurality of preset rib query items having a one-to-one correspondence with a plurality of ribs in the medical image.

4. The method of claim 2, wherein after performing the parallel decoding on the feature vector corresponding to respective rib query item of the at least one rib query item, to obtain the rib detection result corresponding to the respective rib query item of the at least one rib query item, the method further comprises:
  segmenting, according to the rib detection result corresponding to the respective rib query item of the at least one rib query item, at least one rib instance from the medical image, to obtain an image segmentation result.

5. The method of claim 4, wherein segmenting, according to the rib detection result corresponding to the respective rib query item of the at least one rib query item, the at least one rib instance from the medical image, to obtain the image segmentation result, comprises:
  for any rib detection result, segmenting a sub-volume block from the medical image according to a prediction value of a pose parameter, in the three-dimensional space, of a detection box in the rib detection result; and
  performing binary segmentation on the sub-volume block, to obtain a segmentation result of a rib instance in the sub-volume block and a segmentation result of a non-rib region in the sub-volume block.

6. The method of claim 4, wherein after segmenting, according to the rib detection result corresponding to the respective rib query item of the at least one rib query item, the at least one rib instance from the medical image, to obtain the image segmentation result, the method further comprises:
  acquiring a segmentation request for any rib instance input by a user, and determining an object rib query item corresponding to the rib instance;
  determining a rib segmentation result corresponding to the object rib query item from the image segmentation result, and taking the determined rib segmentation result as a segmentation result of the rib instance; and
  prominently displaying, in the medical image, the segmentation result of the rib instance.

7. The method of claim 2, wherein performing the feature coding on the different rib regions in the medical image, to obtain the plurality of feature vectors, comprises:
  adjusting a pixel spacing in the medical image to obtain an isotropic medical image;
  extracting, by using a segmentation network, a three-dimensional region of interest comprising ribs from the isotropic medical image;
  performing feature extraction on the region of interest, to obtain spatial features; and
  performing, based on a self-attention mechanism, self-attention coding on the spatial features, to obtain the feature vectors corresponding to the different rib regions.

8. The method of claim 7, wherein before performing the feature extraction on the region of interest, to obtain the spatial features, the method further comprises:
  performing at least one of operations on the region of interest to implement data enhancement on the region of interest, wherein the operations comprise: random displacement, random scale transformation, random rotation, random clipping, and random erasure.

9. The method of claim 2, wherein the performing the parallel decoding on the feature vector corresponding to respective rib query item of the at least one rib query item, to obtain the rib detection result corresponding to respective rib query item of the at least one rib query item, comprises:
  for any rib query item, performing decoding on a feature vector corresponding to the rib query item based on an attention mechanism, to obtain a decoded vector;
  performing classification calculation according to the decoded vector, to obtain a rib prediction classification corresponding to the rib query item; and
  performing bounding box prediction according to the decoded vector, to obtain a prediction value of a pose parameter, in the three-dimensional space, of a rib detection box corresponding to the rib query item; wherein the prediction value of the pose parameter comprises at least one of: a prediction value of a center position of the rib detection box, a prediction value of a scale of the rib detection box, and a prediction value of a rotation angle of the rib detection box.

10. The method of claim 1, wherein the determining the penalty term between the rib query item corresponding to the respective rib instance of the at least one rib instance and the true value of the rib classification corresponding to the respective rib instance of the at least one rib instance, comprises: for any rib query item, querying, from a preset weighted adjacency matrix, a penalty value between the rib query item and a true value of a rib classification corresponding to the rib query item; wherein, in the weighted adjacency matrix, indexes of a plurality of rib query items are stored by row, and indexes of a plurality of true values of rib classifications are stored by column; and the greater a difference between a value of an index of a rib query item and a value of an index of a true value of a rib classification is, the greater a penalty value corresponding to a cross position between the value of the index of the rib query item and the value of the index of the true value of the rib classification.

11. A method for detecting a rib with a medical image, comprising: acquiring, in response to a calling request for a first interface from a client, a three-dimensional medical image comprising ribs from an interface parameter of the first interface; performing, using a neural network model, feature coding on different rib regions in the medical image, to obtain a plurality of feature vectors; determining, according to a learned corresponding relationship between rib query items and the different rib regions in the medical image, a feature vector corresponding to a respective rib query item of at least one rib query item, wherein there is a one-to-one correspondence between the at least one rib query item and at least one rib instance to be detected; and performing parallel decoding on the feature vector corresponding to the respective rib query item of the at least one rib query item, to obtain a rib detection result corresponding to the respective rib query item of the at least one rib query item, wherein any rib detection result comprises: a rib prediction classification, and a prediction value of a pose parameter, in a three-dimensional space, of a rib detection box, wherein after performing the parallel decoding on the feature vector corresponding to the respective rib query item of the at least one rib query item, to obtain the rib detection result corresponding to respective rib query item of the at least one rib query item, the method further comprises: acquiring a true value of a rib classification corresponding to the respective rib query item of the at least one rib query item and a true value of a pose parameter of a rib detection box corresponding to the respective rib query item of the at least one rib query item; determining a classification loss, according to an error between the true value of the rib classification corresponding to the respective rib query item of the at least one rib query item and the rib prediction classification corresponding to the respective rib query item of the at least one rib instance; determining a bounding box prediction loss, according to an error between the true value of the pose parameter of the rib detection box corresponding to the respective rib query item of the at least one rib query item and the prediction value of the pose parameter of the rib detection box corresponding to the respective rib query item of the at least one rib query item; determining a penalty term between the rib query item corresponding to the respective rib instance of the at least one rib instance and the true value of the rib classification corresponding to the respective rib instance of the at least one rib instance; determining a matching loss according to the classification loss, the bounding box prediction loss, and the penalty item; and updating, according to the matching loss, a matching relationship between the at least one rib query item and the true value of the rib classification, to learn the corresponding relationship between the rib query items and the different rib regions in the medical image.

12. The method of claim 11, wherein the at least one rib query item comprises:
a rib query item corresponding to an object rib input by a user; or
a plurality of preset rib query items having a one-to-one correspondence with a plurality of ribs in the medical image.

13. The method of claim 11, wherein after performing the parallel decoding on the feature vector corresponding to respective rib query item of the at least one rib query item, to obtain the rib detection result corresponding to respective rib query item of the at least one rib query item, the method further comprises:
segmenting, according to the rib detection result corresponding to the respective rib query item of the at least one rib query item, at least one rib instance from the medical image, to obtain an image segmentation result.

14. The method of claim 13, wherein the segmenting, according to the rib detection result corresponding to the respective rib query item of the at least one rib query item, the at least one rib instance from the medical image, to obtain the image segmentation result, comprises:
for any rib detection result, segmenting a sub-volume block from the medical image according to a prediction value of a pose parameter, in the three-dimensional space, of a detection box in the rib detection result; and
performing binary segmentation on the sub-volume block, to obtain a segmentation result of a rib instance in the sub-volume block and a segmentation result of a non-rib region in the sub-volume block.

15. The method of claim 13, wherein after segmenting, according to the rib detection result corresponding to respective rib query item of the at least one rib query item, the at least one rib instance from the medical image, to obtain the image segmentation result, the method further comprises:
acquiring a segmentation request for any rib instance input by a user, and determining an object rib query item corresponding to the rib instance;
determining a rib segmentation result corresponding to the object rib query item from the image segmentation result, and taking the determined rib segmentation result as a segmentation result of the rib instance; and
prominently displaying, in the medical image, the segmentation result of the rib instance.

16. The method of claim 11, wherein performing the feature coding on the different rib regions in the medical image, to obtain the plurality of feature vectors, comprises:
adjusting a pixel spacing in the medical image to obtain an isotropic medical image;
extracting, by using a segmentation network, a three-dimensional region of interest comprising ribs from the isotropic medical image;
performing feature extraction on the region of interest, to obtain spatial features; and
performing, based on a self-attention mechanism, self-attention coding on the spatial features, to obtain the feature vectors corresponding to the different rib regions.

17. The method of claim 16, wherein before performing the feature extraction on the region of interest, to obtain the spatial features, the method further comprises:
performing at least one of operations on the region of interest to implement data enhancement on the region of interest, wherein the operations comprise: random displacement, random scale transformation, random rotation, random clipping, and random erasure.

18. An electronic device, comprising a memory and a processor; wherein,
the memory is configured for storing one or more computer instructions; and
the processor is configured for executing the one or more computer instructions, to perform steps of the method of claim 1.

19. A computer-readable storage medium storing a computer program, wherein the computer program, when executed, enables to implement steps of the method of claim 1.

* * * * *